United States Patent [19]

Ades

[11] 4,095,499
[45] Jun. 20, 1978

[54] ELECTRICAL HOUSEHOLD APPLIANCE EQUIPPED WITH A REMOVABLE ACCESSORY SUCH AS A VEGETABLE CUTTER

[75] Inventor: Edouard Pierre Julien Ades, Paris, France

[73] Assignee: Moulinex, Societe Anonyme, Bagnolet, France

[21] Appl. No.: 764,688

[22] Filed: Feb. 1, 1977

[30] Foreign Application Priority Data

Feb. 12, 1976 France .................. 76 03848

[51] Int. Cl.² .............................................. B26D 4/28
[52] U.S. Cl. ...................................... 83/471; 83/860; 83/571; 83/592; 241/199.12; 241/36
[58] Field of Search ............... 83/409, 409.2, 411 R, 83/411 A, 860, DIG. 1, 571, 592, 471; 241/199.12, 36

[56] References Cited

U.S. PATENT DOCUMENTS

| | | | |
|---|---|---|---|
| 2,894,551 | 7/1959 | Otto | 241/199.12 X |
| 2,982,483 | 5/1961 | Heinemans | 241/36 |
| 3,434,518 | 3/1969 | Motis | 241/199.12 |
| 3,528,469 | 9/1970 | Mantelet | 241/199.12 |
| 3,892,365 | 7/1975 | Verdun | 241/282.1 X |

Primary Examiner—Willie G. Abercrombie
Attorney, Agent, or Firm—Young & Thompson

[57] ABSTRACT

In an electrically operable household appliance of the kind in which a detachable accessory, such as a vegetable cutter, is seated on the top of a base and includes a casing which contains working elements adapted to be coupled to the output shaft of an electric motor which is housed in the base and is controlled by a switch which is operable by a key situated in the top part of the base and is actuated by a push-button mounted on the accessory, the casing of the accessory is fixed to the base by at least one fastener comprising a hook which is articulated on the casing and has a hook portion arranged to come into engagement with the base, and the push-button is mounted on the hook.

8 Claims, 3 Drawing Figures

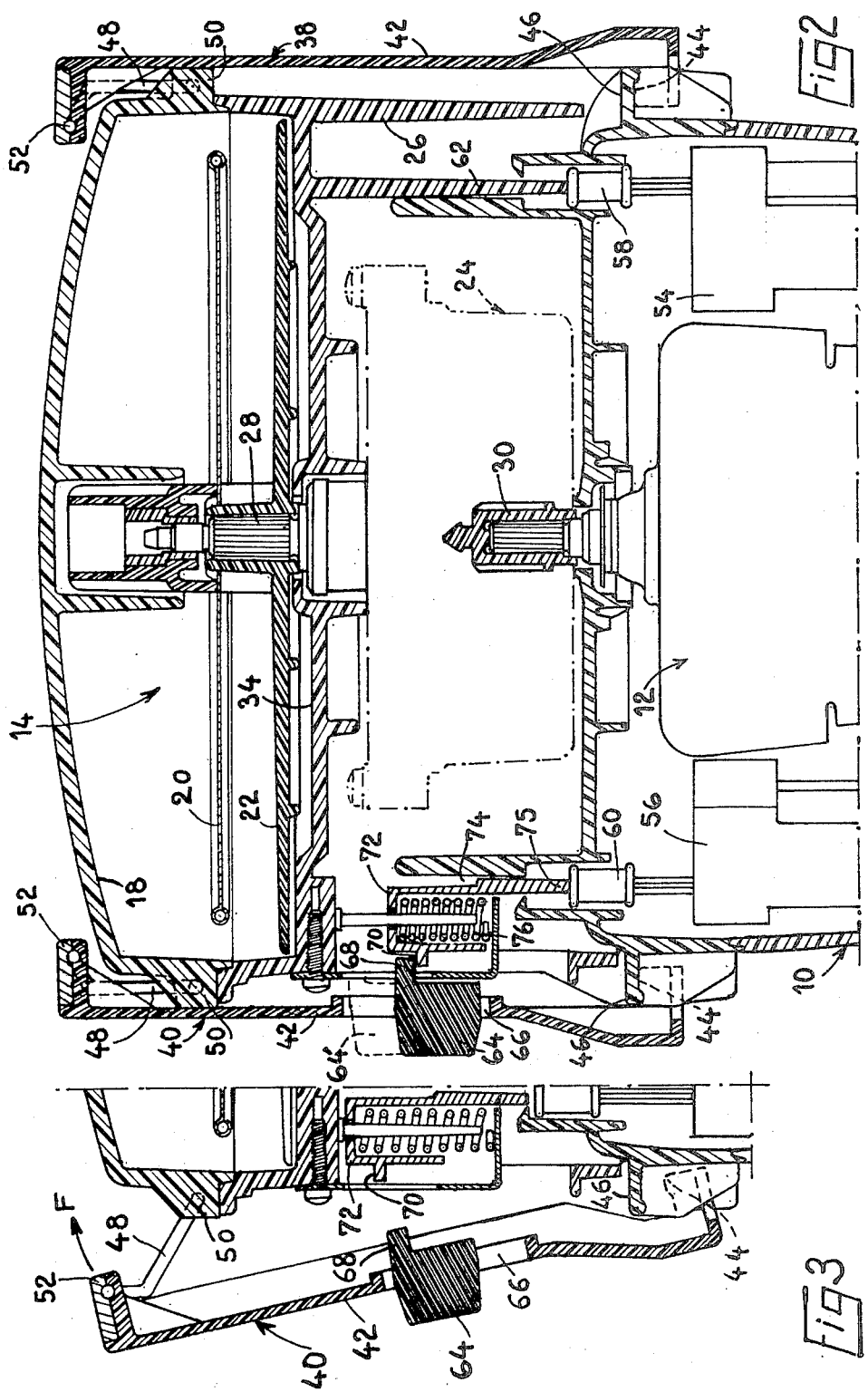

ELECTRICAL HOUSEHOLD APPLIANCE EQUIPPED WITH A REMOVABLE ACCESSORY SUCH AS A VEGETABLE CUTTER

BACKGROUND OF THE INVENTION

This invention relates to electrically operable household appliances comprising a base having a top arranged to constitute a seat for a removable accessory, such as a vegetable cutter, including a casing containing working elements adapted to be coupled to the output shaft of an electric motor which is housed in the base.

The invention relates in particular to appliances of the above kind in which the motor is controlled by at least one switch which is operable by a key situated in the top part of the base an is actuated by a push-button mounted on the acessory for movement between an operative position, in which the key is brought into its working position, and an inoperative position, in which the key is in its position of rest.

When using such appliances it is convenient for the accessory to be suitably positioned on the base before any action is applied to the switch push-button, in order to prevent damage to the appliance and in particular to reduce risk of injury to the user.

It is an object of the invention to prevent the operation of an appliance before the accessory is correctly placed in position.

SUMMARY

In an appliance of the kind set forth above the casing of the accessory is arranged to be fixed to the base by at least one fastener comprising a hook articulated on the casing and the hook portion of which is arranged to come into engagement with the base, and the push-button is mounted on the hook.

As the result of this arrangement, as long as the fastener is not correctly fastened on the base of the appliance the user cannot operate the switch key. Once the accessory and the fastener have been correctly positioned, the user will simply depress the push-button to operate the switch and therefore to operate the appliance.

BRIEF DESCRIPTION OF THE DRAWINGS

FIG. 2 is a vertical section on the line II-II in FIG. 1, showing the accessory fixed by means of two fasteners; and FIG. 3 is a view of one of the fasteners which has been moved to the unlocked position.

DESCRIPTION OF THE PREFERRED EMBODIMENT

Figure 1:
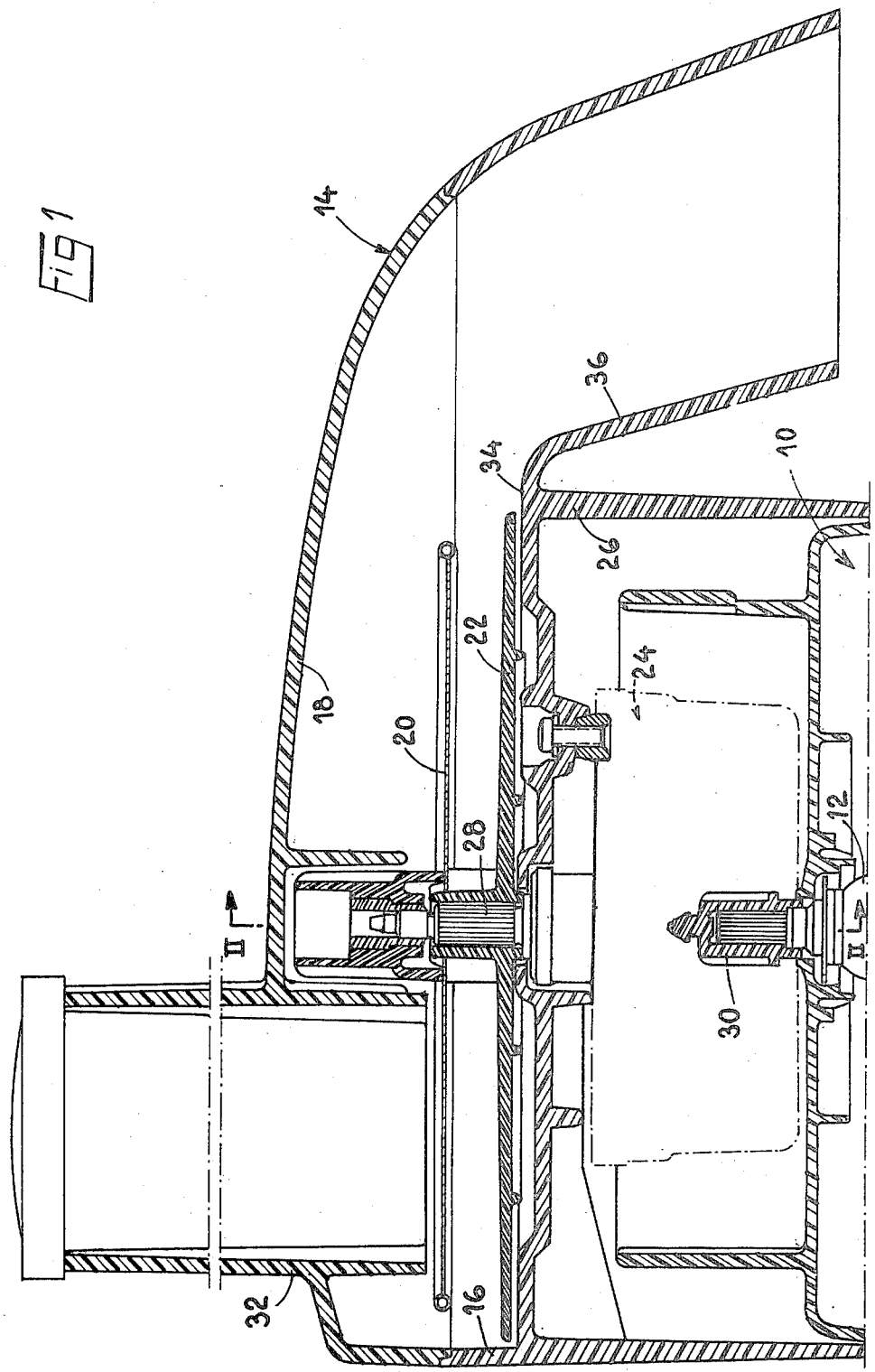
FIG. 1 is a section of a part of an electrically operable household appliance provided with a vegetable cutter accessory.

Referring to the drawings, the electrically operable household appliance comprises a base 10 which contains an electric motor 12. The top of the base 10 constitutes a seat receiving a removable accessory 14, such as a vegetable cutter. The vegetable cutter comprises a casing which includes a working bowl 16, a cover 18 removably covering the bowl, and working elements which are disposed inside the casing and comprise a vegetable cutter disk 20, a centrifugal ejection disk 22 situated under the disk 20, and speed reduction gearing 24 (shown in dash-dotted lines) which is disposed in a skirt 26 which depends from the bottom 34 of the bowl 16 and has an output shaft 28 which rotatably drives the two disks 20 and 22, and an input shaft which is coupled to the output shaft 30 of the motor 12. The cover 18 has a hopper 32 intended for the introduction of foodstuff at a position above and over the disk 20, and the bottom 34 of the bowl 16 communicates with a lateral spout 36 for the ejection of the cut foodstuff.

As can be seen in FIG. 2, the casing of the vegetable cutter is fixed on the base 10 by means of two diametrically opposite fasteners 38 and 40 which are of the so-called "toggle clamp" type, each comprising a hook 42, the hook portion 44 of which comes into engagement with a lug 46 on the base 10 and which is articulated on the cover 18 of the casing by means of a rocking stirrup 48 interposed between a boss 50 on the cover 18 and the opposite end 52 of the hook to that where its hook portion 44 is situated.

The motor 12 is controlled by two switches 54 and 56 which are disposed in series in the electrical supply circuit of the motor, and which have operating keys 58 and 60 which are displaceable vertically in the base 10 and are situated on the top part of the base in two diametrically opposite regions adjacent the lugs 46 receiving the fasteners 38 and 40. One of the keys 58 is held in the working position (in which position the switch 54 is closed) by a rigid finger 62 which extends downwards from the bottom 34 of the bowl 16. The other key is operated by means of a push-button 64 mounted on the vergetable cutter for movement between an operative position (in solid lines in FIG. 2), in which the key 60 is brought into the working position (switch 56 closed) and an inoperative position (64' in broken lines) in which the key 60 is in the position of rest (switch 56 open and current to the motor cut off).

The movable push-button 64 is carried by the hook 42 of the fastener 40 and is mounted to be slidable in a guide formed by a slot 66 provided in the hook 42 and extending lengthwise of the hook. The push-button 64 is provided with a stud 68 which with the fastener 40 in the fastened position (FIG. 2) comes into engagement with a horizontal bearing surface 70 provided on a movement transmission slide 72 which is interposed between the push-button 64 and the key 60 and is mounted in a recess 74 provided in the skirt 26 of the bowl 16. The slide 72 is slidable vertically in the recess 74 between an operative position (FIG. 2), in which a finger 75 on the slide brings the key 60 into the working position, ad a inoperative position (FI. 3) in which the key is in the position of rest to which position the slide 72 is returned by a spring 76 disposed in the recess 74.

For the purpose of using the vegetable cutter, the bowl 16 provided with the working elements 20, 22, and 24 is first placed on the base 10; the reduction gearing 24 is thereby coupled to the output shaft 30 of the motor 12; the rigid finger 62 comes into engagement with the key 58 of the switch 54 and brings that key into the working position; the movable finger 75 of the slide 72 takes up position above the key 60 of the switch 56, but leaves the key 60 in the position of rest (FIG. 3).

The cover 18 is then placed on the appliance so as to cover the working bowl 16, thus depriving the user of access to the cutting disk 20. The fasteners 38 and 40 are positioned facing the lugs 46 of the base, for example in the position shown in FIG. 3.

The vegetable cutter is then fastened to the base 10 by engaging the hook portions 44 of the hooks 42 under the lugs 46, then swinging the top ends 52 of the hooks 42 inwards as indicated by the arrow F in FIG. 3. The fasteners 38 and 40 then assume the position shown in FIG. 2, the stud 68 of the push-button 64 coming into engagement with the bearing surface 70 of the slide 72. Downward pressure on the push-button 64, for the purpose of bringing it from the position 64' shown in broken lines to the position shown in solid lines, brings the slide 72 into its operative position in which the finger 75 of the slide 72 brings the key 60 into its working position shown in FIG. 2. The two switches 54 and 56 then being closed, the motor 12 operates and the disk 20 rotates.

When the push-button 64 is released, the spring 76 brings the slide 72 to its inoperative position, thus opening the switch 56 and also returning the push-button 64 to its inoperative position 64'.

It will be understood that the device thus constituted for controlling the operation of the motor offers complete safety to the user, because the cutting disk 20 is entirely unable to rotate until the vegetable cutter has been correctly fastened on the appliance, that is to say until the protective cover 18 has been correctly fixed above the disk 20.

I claim:

1. An electrically operable household appliance comprising a base having a top arranged to constitute a seat for a detachable accessory, including a working bowl and a cover removably covering the bowl, said bowl containing working elements adapted to be coupled to the output shaft of an electric motor which is housed in the base and is controlled by at least one switch which is operable by a key situated in the top part of the base and is actuated by a push button mounted on the accessory for movement between an operative position, in which the key is brought into its working position, and an inoperative position, in which the key is in its position of rest, said accessory being fixed to the base by at least one fastener comprising a hook articulated on the cover and the hook portion of which is releasably engageable with the base, wherein the push-button is mounted on the hook and is slidable in a guide on said hook between said operative position and said inoperative position.

2. An appliance according to claim 1, wherein the guide extends lengthwise of the hook.

3. An appliance according to claim 2, wherein the key of the switch is movable vertically in the base and a slide is interposed between the push-button and the key, said slide being mounted in a recess in the base of the working bowl and arranged to slide vertically between an operative position in which the key is brought into its working position, and an inoperative position in which the key is in its position of rest.

4. An appliance according to claim 3, in which said slide slides upwardly from said operative position to said inoperative position.

5. An appliance according to claim 3, wherein the slide is returned to its operative position by resilient means.

6. An appliance according to claim 5, wherein the push-button has a lateral stud engageable with a horizontal bearing surface on the slide.

7. An appliance according to claim 1, wherein the appliance comprises two control switches and the operating key of one of the switches is held in the working position by a rigid finger fastened to the bowl and the operating key of the other switch is actuated by means of the push-button mounted on the fastening hook.

8. An appliance according to claim 1, wherein the fastener is of the toggle-clamp type and the hook is articulated on the cover by a rocking stirrup interposed between the cover and the end of the hook opposite the end thereof which comprises said hook portion.

* * * * *